C. B. KING.
AUTOMOBILE.
APPLICATION FILED FEB. 28, 1912.

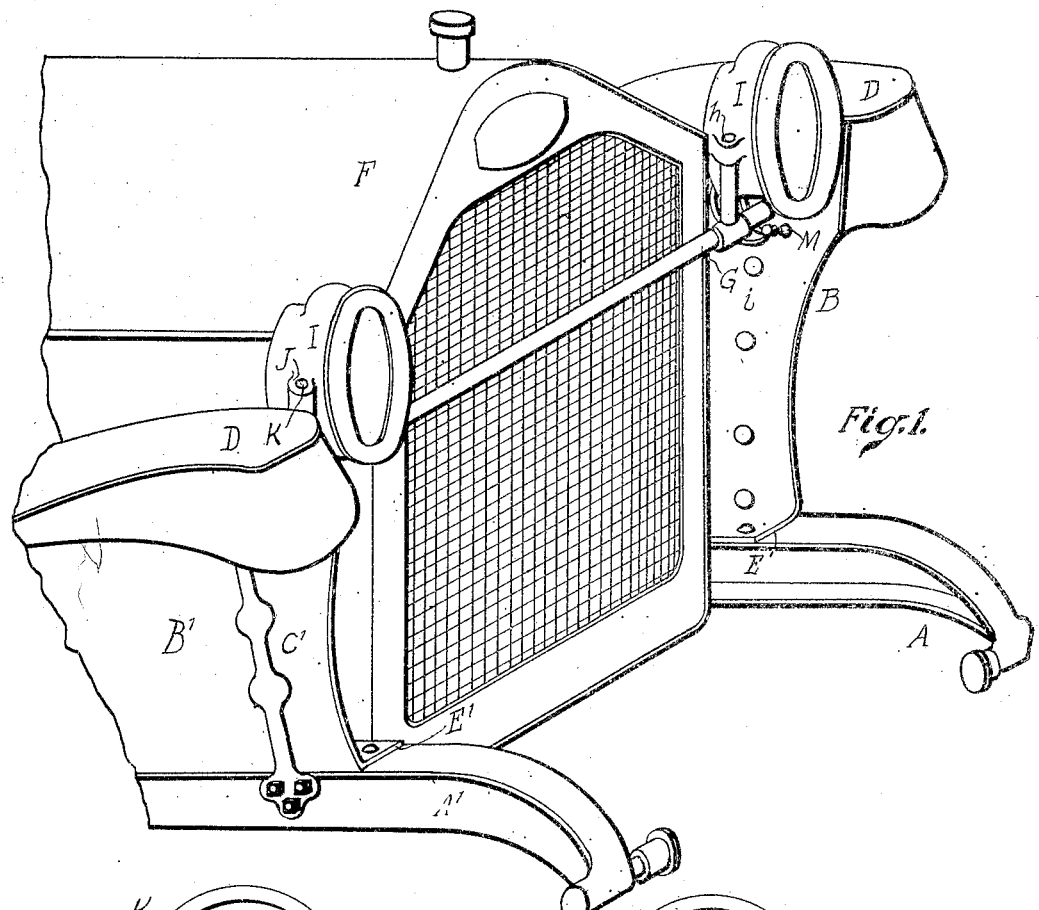
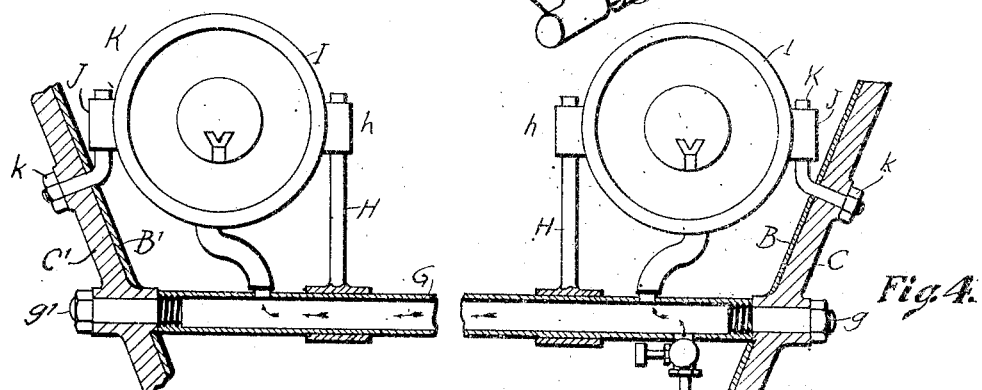

1,100,309.

Patented June 16, 1914.
2 SHEETS—SHEET 2.

WITNESSES:
Paul A. R. Kroesing.
Lotta Lee Bray.

INVENTOR.
Charles B. King
BY
Ralzemond A. Parker
ATTORNEY.

UNITED STATES PATENT OFFICE.

CHARLES B. KING, OF DETROIT, MICHIGAN, ASSIGNOR, BY MESNE ASSIGNMENTS, TO KING MOTOR CAR COMPANY, A CORPORATION OF MICHIGAN.

AUTOMOBILE.

1,100,309.   Specification of Letters Patent.   Patented June 16, 1914.

Application filed February 28, 1912. Serial No. 680,474.

*To all whom it may concern:*

Be it known that I, CHARLES B. KING, a citizen of the United States, residing at Detroit, county of Wayne, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and consists in the improvements hereinafter described and pointed out in the claims.

Figure 2:
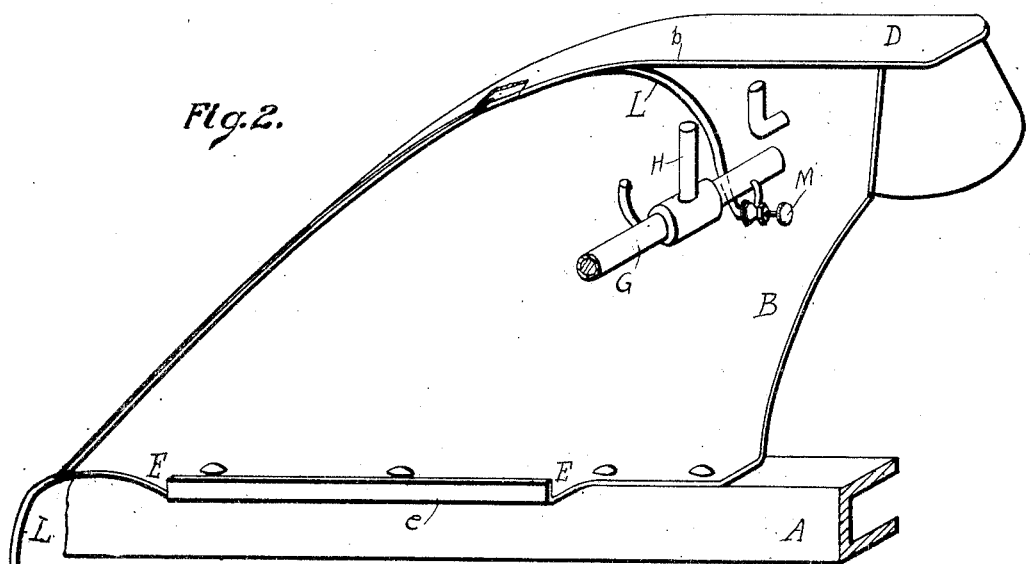
Figure 3:
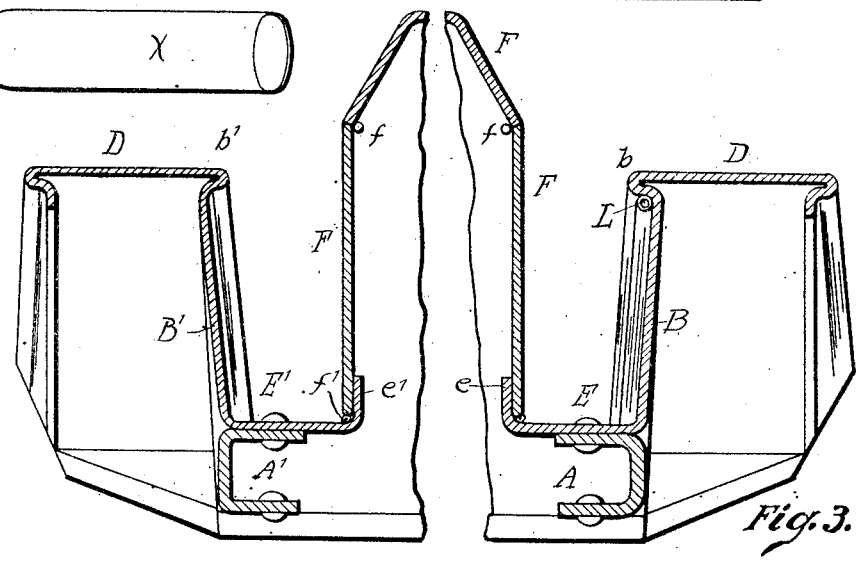

In the accompanying drawings, Figure 1, is a perspective view of so much of the front portion of an automobile embodying my invention as is necessary to illustrate the same. Fig. 2, is a perspective view of a portion of the side piece of the chassis with the wheel guard and adjacent parts mounted thereon. Fig. 3, is a section of the two side pieces, wheel guards and the engine casing, a portion of the same being broken away at the center to contract the figure laterally. Fig. 4, is a detail sectional view of a portion of the wheel guards and parts adjacent thereto.

A, A$^1$ are the side pieces of the chassis.

B and B$^1$ are the wheel guards mounted on the side pieces A, A$^1$.

C, C$^1$ are ribs secured at their lower ends to the outer surfaces of the side pieces A, A$^1$ and extending upward and outward therefrom. The guards B, B$^1$ are made of sheet metal and are bent inward toward their lower edges to form the flat horizontal portions E E$^1$ which are secured upon the upper surface of the side pieces A, A$^1$ of the chassis and extend beyond the inner edges thereof. The inner edges of the portions E, E$^1$ are turned upward to form the flanges $e$, $e^1$.

F, is the casing for the power plant; this extends downward contiguous to the outer surfaces of the up-turned edges $e$, $e^1$ of the portions E, E$^1$ of the guards B, B$^1$.

G, is a tube extending horizontally between the guards B, B$^1$, its ends extending through apertures in said guards and the ribs C C and being secured at each end by bolts $g$, $g^1$ (Fig. 4) to the ribs C, C. The construction adjacent to one end of the tube G is the same as the other end of the same. There is a standard H rising from the tube G toward each end thereof.

I, I are lamps each of which has lugs J and $h$ extending from it.

K, is a bolt extending through an aperture through a guard B and rib C and upward to form a support for one side of the lamp.

$k$ is a nut upon the end of the bolt K adapted to secure said bolt in position. Each of the lamps I I is adjusted in position by the lugs J and $h$ passing over the vertical ends of a bolt K and standard H, said lugs being provided with apertures for this purpose.

The guards B, B$^1$ are turned over to form the portion D which passes over the wheel and along the edge of this turned over portion, is formed an inwardly extending bead $b$.

L, is a pipe leading from the acetylene tank which may be located at any convenient point as, for instance, upon the foot board of the vehicle. The pipe L passes through an aperture in the tube G and is adapted to supply gas to the interior of said tube and through this to the lamps I I$^1$.

M, is a needle valve by which the passage from the pipe L to the tube G is controlled.

It will be noted that by this arrangement a strong and rigid construction is secured and a convenient place provided for readily attaching the lamps. That any water that may run off from the casing F will be received in the trough-like construction formed at E, E$^1$ and discharged at the end of such trough.

The tube G not only forms a support for the lamp but serves to rigidly brace the guards B, B$^1$ and forms a conduit for conveying the gas to the burners of the lamps.

By the arrangement of the tube L with the valve M this small tube is placed out of the way where it is not liable to be struck and injured and the operator may adjust the flow of gasolene to his lamp while observing the effect of each adjustment so that he does not have to, as has heretofore been the custom, adjust the valve at a point near the acetylene tank and then walk around in front of the automobile and observe its effect and repeat this operation until a satisfactory light is obtained.

What I claim is:—

1. In an automobile, the combination of a side piece of the chassis of an automobile, a guard rising from the outer edge of the side piece and bent to extend inward along the upper surface of said side piece, and having the inner portion of the part of the said guard, which extends along the surface of the side piece, turned vertically upward.

2. In an automobile, the combination of a side piece of the chassis of an automobile, a guard rising from the outer edge of the side piece and bent to extend inward along the upper surface of said side piece, and having the inner portion of the part of said guard, which extends along the surface of the side piece turned vertically upward, and a cover for the power plant extending downward against the portion of said guards which extends along the surface of the side piece of the chassis.

3. The combination of the side pieces of the chassis of an automobile, guards extending upward from said side piece and secured thereto and a part G extending between said guards above said side pieces and secured to said guards so as to form a brace for said guards.

4. The combination of the side pieces of the chassis of an automobile, guards extending upward from said side piece and secured thereto, a part extending between said guards above said side pieces and secured to said guards so as to form a brace for said guards, the part being adapted to serve as a support for the lamps, and a lamp secured to the part.

5. In an automobile, a guard B provided with a bead $b$ along the upper part of the approximately vertical portion, a conduit tube L for the acetylene, passing under said bead, and contiguous to said approximately vertical portion of said guard.

6. In an automobile, the combination of the wheel guards, a part G extending between said guards secured thereto and adapted to form a brace therefor, a standard H rising from the part G and adapted to support the lamp.

7. In an automobile, the combination of the wheel guards, a part G extending between said guards secured thereto, and adapted to form a brace, a standard H rising from the part G and adapted to support the lamp, a bolt K extending from said guard and adapted to form means of attachment of said lamp, and a lamp secured to said standard and bolt said lamp and its attachment forming a corner brace for the cross bar G and the standard.

8. In an automobile, the combination of the wheel guards, a tube G extending from one of said guards to the other and secured to said guards to form a brace, a conduit for gas communicating with the interior of said tube, and a lamp having its burner communicating with the interior of said tube.

9. In an automobile, the combination of the wheel guards, a tube G extending from one of said guards to the other and secured to said guards to form a brace, a conduit for gas communicating with the interior of said tube, a lamp supported upon and having its burner communicating with the interior of said tube.

10. In a vehicle, the combination with the frame, of opposite wheel mud guards or fenders fixed in relation to the frame, supports for said fenders, a cross-tie between the fenders mounted upon said supports, and a lamp mounted upon said cross-tie.

11. In a vehicle, the combination with the frame, of opposite wheel mud guards or fenders, a cross-tie connecting the fenders, a lamp mounted on said cross-tie, and an arm rising from the vehicle frame forming a common support for said cross-tie and fenders and rigidly securing the latter in fixed relation to the frame.

12. In a vehicle, the combination with the frame, of opposite wheel mud guards or fenders, inclined bracket arms secured to the frame and supporting the fenders in fixed relation thereto, a cross-tie connecting said bracket arms, and a pair of upwardly extending arms on said cross-tie forming the lamp support.

In testimony whereof, I sign this specification in the presence of two witnesses.

CHARLES B. KING.

Witnesses:
PAUL A. R. KROESING,
AGNES M. HIPKINS.